United States Patent [19]

Towata et al.

[11] Patent Number: 4,732,779

[45] Date of Patent: Mar. 22, 1988

[54] FIBROUS MATERIAL FOR COMPOSITE MATERIALS, FIBER-REINFORCED METAL PRODUCED THEREFROM, AND PROCESS FOR PRODUCING SAME

[75] Inventors: Shinichi Towata; Senichi Yamada, both of Toyota, Japan

[73] Assignee: Kabushiki Kaisha Toyota Chuo Kenkyusho, Japan

[21] Appl. No.: 865,293

[22] Filed: May 21, 1986

[30] Foreign Application Priority Data

May 21, 1985 [JP] Japan ................................ 60-108772
Jun. 21, 1985 [JP] Japan ................................ 60-135429

[51] Int. Cl.$^4$ ............................................. B05D 1/18
[52] U.S. Cl. ................................... 427/57; 427/430.1; 427/434.6; 427/434.5; 428/367; 428/378; 428/379; 428/392; 156/166; 156/180
[58] Field of Search ................... 427/57, 430.1, 434.5, 427/434.6, 434.7; 428/372, 367, 378, 379, 392; 156/166, 180

[56] References Cited

U.S. PATENT DOCUMENTS

| | | | |
|---|---|---|---|
| 3,776,297 | 12/1973 | Williford et al. | 427/434.6 |
| 3,814,621 | 1/1974 | Massa | 427/434.6 |
| 4,472,478 | 9/1984 | Briggs et al. | 428/372 X |

FOREIGN PATENT DOCUMENTS

| | | | |
|---|---|---|---|
| 18392 | 7/1934 | Australia | 427/434.6 |
| 129759 | 7/1984 | Japan | 427/434.6 |

Primary Examiner—Shrive P. Beck
Attorney, Agent, or Firm—Parkhurst & Oliff

[57] ABSTRACT

The present invention relates to a fibrous material for composite materials, a fiber-reinforced metal produced therefrom, and a process for producing same. The fibrous material is composed of continuous filament fibers selected from heat resistant substances and short fibers, whiskers, or powders selected from heat resistant substances. The fiber-reinforced metal is composed of the fibrous material and a matrix metal, has a reduced anisotropy of mechanical properties, and can be made at my desired fiber volume ratio.

17 Claims, 11 Drawing Figures

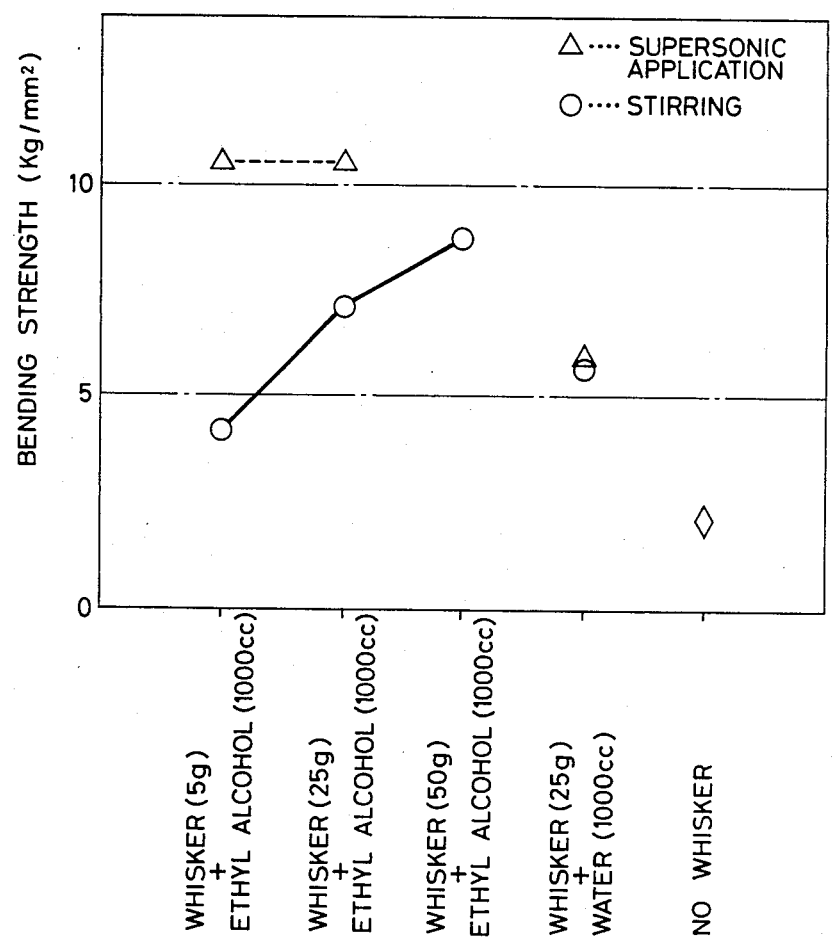

FIBROUS MATERIAL FOR COMPOSITE MATERIALS, FIBER-REINFORCED METAL PRODUCED THEREFROM, AND PROCESS FOR PRODUCING SAME

BACKGROUND OF THE INVENTION

1. Field of the Invention

The present invention relates to a fibrous material for composite materials and fiber-reinforced metal produced therefrom, and also to a process for producing same.

2. Description of the Prior Art

Fiber-reinforced metals (FRM) have recently come into general use as machine parts and structural members. Among others, FRM composed of an aluminum alloy as a matrix and continuous fibers of ceramics or carbon as a reinforcement are known for their outstanding performance. FRM is light in weight, has a high stiffness, and keeps a high strength at high temperatures (i.e., 200° to 400° C.). FRM is produced by, for example, the squeeze casting method. This casting method is suitable for making parts of complex shape such as automotive parts and precision machine parts.

Reinforcements for FRM usually undergo surface treatment because they are difficult to wet by a matrix metal, especially an aluminum alloy or magnesium alloy, and once they do wet, the reinforcements react with the matrix and undergo degradation. The surface treatment is performed by, for example, the CVD and plating methods. According to these methods, the reinforcement fibers are coated with metal or ceramics in the form of a thin uniform film. These methods, however, have some drawbacks. For example, the thin film is liable to peel off due to the differences between the coefficients of thermal expansion for the reinforcement fiber and the matrix. This lessens the effect of surface treatment. If the coating film is made thicker, the reinforcement fibers become rigid and brittle and are susceptible to damage. In addition, a complex apparatus is required for the surface treatment of individual fibers, which adds to production cost.

On the other hand, continuous filament fibers used as reinforcements also have disadvantages. Where the fibers are used for the production of FRM by the squeeze casting method, the fibers are unevenly distributed in the product. This makes it difficult to control the fiber volume ratio (Vf) in FRM, especially in a case where the Vf is small. FRM reinforced with continuous filament fibers alone greatly varies in strength depending on the direction (axis) tested. For example, FRM made by squeeze casting from an aluminum alloy and reinforced with continuous carbon fibers has a strength of 130 kg/mm$^2$ in the direction parallel to the fiber axis, whereas it has only about several kg/mm$^2$ in the direction perpendicular to the fiber axis. On the other hand, FRM produced from short fibers alone is isotropic but generally has poor strength.

Heretofore, there has been proposed the combined use of continuous filament fibers or long fibers with short fibers or whiskers as the reinforcement fibers for composite materials. For example, long fibers are used to form the inside part of FRM while short fibers are used to form the outside part of FRM. In another example, a prepeg for FRM is produced by pressure-forming in the presence of long and short fibers mixed together. In the first example, a complex process is required and the resulting FRM is not satisfactory in strength. In the second example, it is difficult to evenly mix long fibers with short fibers. (It may be possible to attach short fibers to the surface of a long fiber bundle by brushing or other means; but it is almost impossible to attach uniformly short fibers to the surface of individual long fibers).

Continuous filament fibers as a reinforcement have a disadvantage in that they are not evenly dispersed in the matrix when FRM are produced by the squeeze casting method. The amount of continuous filament fibers used for reinforcement is 40 to 60%. However, unevenly dispersed continuous filament fibers in such a large proportion come into contact with one another in the matrix, thus reducing the intended strength of the product.

The compatibility of fibers with any given matrix is greatly affected by the composition of the matrix alloy. Therefore, it should be properly selected according to the properties of continuous filament fibers to be used. For example, when an aluminum alloy matrix containing magnesium, silicon, copper, etc. is incorporated with continuous silicon carbide fibers, the magnesium and silicon degrade the fibers, thus forming brittle silicon crystals, and the copper causes the eutectic phases in FRM to grow. This tendency is pronounced in the case of FRM containing a large amount of fibers. Where the reinforcement is alumina fibers, silicon in the alloy degrades the fibers and magnesium and copper cause the eutectic phases in FRM to grow. Where the reinforcement is carbon fibers, magnesium degrades the fibers at high temperatures (although it increases the strength in the transverse direction) and copper and silicon make the eutectic phases in FRM coarser, reducing the strength in the cross direction. For reasons mentioned above, it has been said that a suitable matrix is pure aluminum which does not form precipitates nor degrades reinforcing fibers. FRM based on a matrix of pure aluminum has a low strength in the transverse direction (the direction perpendicular to the lengthwise direction of continuous fibers) because the matrix itself has a low strength.

SUMMARY OF THE INVENTION

The present invention eliminates the above-mentioned disadvantages in the prior art technology.

Accordingly, it is an object of the invention to provide a reinforcing fibrous material for composite materials and a process for producing same. The reinforcing fibrous material has an improved wettability with the matrix metal when used for FRM. The reinforcing fibrous material can be evenly dispersed in the composite material at a properly controlled fiber volume ratio. The reinforcing fibrous material may be composed of different kinds of continuous filament fibers, in which case the reinforcing fibrous material improves the mechanical properties of the composite material through the reduction of thermal stress between the continuous filament fibers and the matrix.

It is another object of the invention to provide a fiber reinforced metal and a process for producing same. The fiber reinforced metal has improved mechanical properties such as low anisotropy and residual stress and good abrasion resistance. It is formed by evenly dispersing continuous filament fibers in a matrix metal, with a controlled fiber volume ratio. The improved mechanical properties are obtained by combining continuous filament fibers with short fibers, whiskers, or powders of different properties.

BRIEF DESCRIPTION OF THE DRAWINGS

FIGS. 8A-C is a schematic representation of the process for producing the fiber-reinforced metal of this invention from the fibrous material of this invention.

FIG. 9 is a graph showing the relationship between the conditions of depositing whiskers on continuous filament fibers and the flexural strength in the direction perpendicular to the fiber axis of the resulting FRM, and also showing the flexural strength in the direction perpendicular to the fiber axis of the conventional FRM.

DETAILED DESCRIPTION OF THE INVENTION

Figure 3:
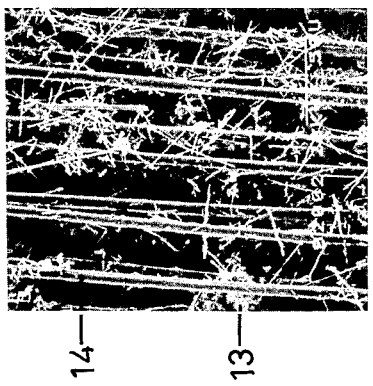
FIGS. 3 to 6 are electron micrographs, each showing the shape of the fibrous material of this invention.

According to the present invention, the fibrous material for composite materials comprises continuous filament fibers made of at least one heat resistant substance selected from the group consisting of ceramics (including silicon carbide, silicon nitride, alumina, silica, alumina-silica, zirconia, beryllia, boron carbide, and titanium carbide), carbon, metals, and intermetallic compounds, with the surface of individual continuous filament fibers having attached thereto short fibers, whiskers, or powders made of at least one heat resistant substance selected from the group consisting of ceramics (including silicon carbide, silicon nitride, alumina, silica, alumina-silica, zirconia, beryllia, boron carbide, and titanium carbide), carbon, metals, and intermetallic compounds.

According to the present invention, the above-mentioned fibrous material is produced by dipping continuous filament fibers or a bundle of continuous filament fibers made of at least one heat resistant substance selected from the group consisting of ceramics (including silicon carbide, silicon nitride, alumina, silica, alumina-silica, zirconia, beryllia, boron carbide, and titanium carbide), carbon, metals, and intermetallic compounds, in a solvent in which are suspended short fibers, whiskers, or powders made of at least one heat resistant substance selected from the group consisting of ceramics (including silicon carbide, silicon nitride, alumina, silica, alumina-silica, zirconia, beryllia, boron carbide, and titanium carbide), carbon, metals, and intermetallic compounds, whereby causing said short fibers, whiskers, or powders to stick to the surface of the individual continuous filament fibers.

According to the present invention, the fiber-reinforced metal comprises a fibrous material composed of continuous filament fibers made of at least one heat resistant substance selected from the group consisting of ceramics (including silicon carbide, silicon nitride, alumina, silica, alumina-silica, zirconia, beryllia, boron carbide, and titanium carbide), carbon, metals, and intermetallic compounds, with the surface of individual continuous filament fibers having attached thereto short fibers, whiskers, or powders made of at least one heat resistant substance selected from the group consisting of ceramics (including silicon carbide, silicon nitride, alumina, silica, alumina-silica, zirconia, beryllia, boron carbide, and titanium carbide), carbon, metals, and intermetallic compounds, and a matrix metal.

According to the present invention, the above-mentioned fiber-reinforced metal is produced by a process which comprises placing a fibrous material or a preform thereof in a mold cavity, pouring a molten metal of the matrix into the cavity, and cooling and solidifying the metal, said fibrous material being composed of continuous filament fibers made of at least one heat resistant substance selected from the group consisting of ceramics (including silicon carbide, silicon nitride, alumina, silica, alumina-silica, zirconia, beryllia, boron carbide, and titanium carbide), carbon, metals, and intermetallic compounds, with the surface of individual continuous filament fibers having attached thereto short fibers, whiskers, or powders made of at least one kind of heat resistant substance selected from the group consisting of ceramics (including silicon carbide, silicon nitride, alumina, silica, alumina-silica, zirconia, beryllia, boron carbide, and titanium carbide), carbon, metals, and intermetallic compounds.

The continuous filament fibers are made of the above-mentioned ceramics, heat-resistant non-metallic substances such as carbon and boron, or heat-resistant metals, alloys, or intermetallic compounds (e.g., molybdenum, tungsten, steel, stainless steel, CuZn, and FeAl). More than one type of the continuous filament fibers may be used in combination with one another. The properties of the fibers should be selected according to the application of the fiber-reinforced metal.

The amount of the short fibers, whiskers, or powders to be attached to the surface of individual continuous filament fibers varies depending on their properties and the application of the fiber-reinforced metal. Where FRM are used as machine parts or structural members, the volume ratio of continuous filament fibers to short fibers (or whiskers or powders) should be 0.5 to 500%.

The matrix metal to be used for the FRM of this invention is aluminum or magnesium or an alloy thereof. The ratio of the matrix metal to the reinforcing fibrous material may vary depending on their kinds and the application of the FRM.

The fibrous material to be used for the FRM of this invention may be produced by any known method such as, for example, electrodeposition, fluidization, spraying, and dipping in suspension. The last method is preferred because of its simplicity and applicability. The dipping in suspension is accomplished by unwinding continuous filament fibers or a bundle of continuous filament fibers from a bobbin and passing them through a suspension containing at least one kind of short fibers, whiskers, or powders, thereby causing the short fibers, whiskers, or powders to stick to the surface of the individual continuous filament fibers, and finally winding up the continuous filament fibers onto a bobbin.

Where a bundle of continuous filament fibers is used, the number of fibers is not specifically limited. However, a small number is preferable because individual fibers are uniformly exposed to the suspension. In the case of a bundle composed of a large number of continuous filament fibers, it is desirable to apply ultrasonic vibration to the suspension so that individual filament fibers are uniformly exposed to the suspension. The ultrasonic vibration may be produced by an ultrasonic generator installed on the outside of the container holding the suspension, or by a proper number of ultrasonic vibrators (e.g., ceramic vibrators) arranged in the suspension. The ultrasonic vibration may be applied continuously or intermittently. The intensity, frequency, and application time of the ultrasound depend on the kind of the short fibers, whiskers, or powders, the concentration of the suspension, and the dipping time. The preferred frequency is 10 to 2000 kHz.

The suspending medium for short fibers, whiskers, or powders may be water, but preferably is an organic solvent such as ethyl alcohol, methyl alcohol or acetone. Ethyl alcohol is particularly preferable among the solvents, because it dissolves a size which might be present on the surface of continuous filament fibers, thus permitting the easy sticking of short fibers. In addition, ethyl alcohol contributes to the increased productivity because of its higher volatility than water. The above-mentioned organic solvent may be used in combination with water.

The concentration of the suspension is not specifically limited. If it is too low, uniform deposition on the continuous filament fibers is not achieved. Conversely, if it is too high, excessive deposition takes place. If silicon carbide whiskers are to be deposited on a bundle of 6000 continuous filament fibers, the preferred concentration of whiskers in the suspension is 0.5 g/l to 30 g/l.

In the case where a bundle of a large number of continuous filament fibers is to be dipped in the suspension, it is desirable to open the bundle by means of a blower. The flow rate of the blower should be properly adjusted depending on the number of filament fibers and whether or not ultrasonic vibration is applied. The blower is not necessarily required if the number of filament fibers is small or the suspension is subjected to sufficient ultrasonic vibration.

Typically, one suspension bath is used, but a plurality of suspension baths may be used where more than one kind of short fibers, whiskers, and powders are used. The dipping time may be adjusted by the ordinary method using rolls. After dipping, the bundle of continuous filament fibers may be dried, if necessary, by means of a drying oven, infrared drier, or hot-air drier prior to winding up onto a bobbin.

The fibrous material produced as mentioned above is then cut to proper length or performed according to the desired FRM product. The cut fiber or performed fibrous material then is arranged in the mold cavity. The fibrous materials of different kinds may also be used in combination with one another. With the cut fiber or preform heated to a prescribed temperature, say 700° to 800° C., the molten metal of the matrix, which has also been heated to almost the same temperature as the cut fiber or preform is poured into the mold cavity. The molten metal is cooled to room temperature under a prescribed pressure, say 400 to 900 kg/cm$^2$. After solidification, the casting may undergo surface finishing and machining.

The continuous filament fibers, the short fibers, whiskers or powders, and the matrix metal used in this invention are all commercially available.

Figure 1:
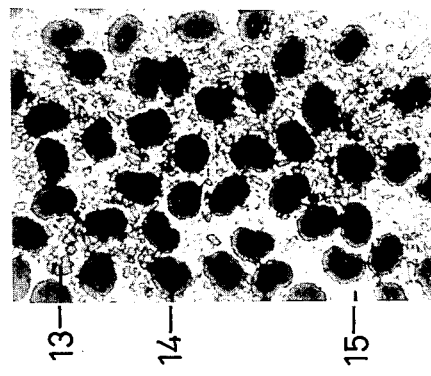
FIG. 1 is an optical microphotograph showing the structure of fiber-reinforced metal of this invention.

FIG. 1 shows an example of the FRM of the present invention. Reference numerals 13, 14, and 15 denote whiskers (or short fibers), continuous filament fibers, and matrix metal, respectively. It is noted that whiskers 13 are arranged in the space between continuous fibers 14 and matrix metal 15 fills the remaining voids. Whiskers 13 may be uniformly distributed in the space or concentrated around continuous filament fibers 14, if proper selections are made from the types and properties of whisker 13, the conditions of deposition, and the conditions of arranging the whisker-deposited continuous filament fibers 14. The matrix metal 15 is reinforced by whiskers 13. Where additional reinforcement is required, the matrix metal may be incorporated with proper elements. The composition of the matrix alloy is not specifically limited. Whiskers 13 arranged in the space between continuous filament fibers 14 prevent same from coming into contact with one another. Whiskers 13 also have additional functions, for example, if the amount of whiskers 13 is changed, the volume ratio of continuous filament fibers 14 can be controlled. Whiskers 13 cross-link continuous filament fibers 14, improving the strength of the resulting FRM in a direction perpendicular to the lengthwise direction of the continuous filament fibers. This reduces the anisotropy of the FRM. If whiskers 13 have a coefficient of thermal expansion equal to or smaller than that of continuous filament fibers 14, the thermal residual stress in the FRM is reduced. If whiskers 13 have good abrasion resistance, the resulting FRM will have superior abrasion resistance.

The invention will now be described in more detail with reference to the following examples, which are illustrative only and which are not intended to limit the scope of the invention.

EXAMPLE 1

Figure 2:
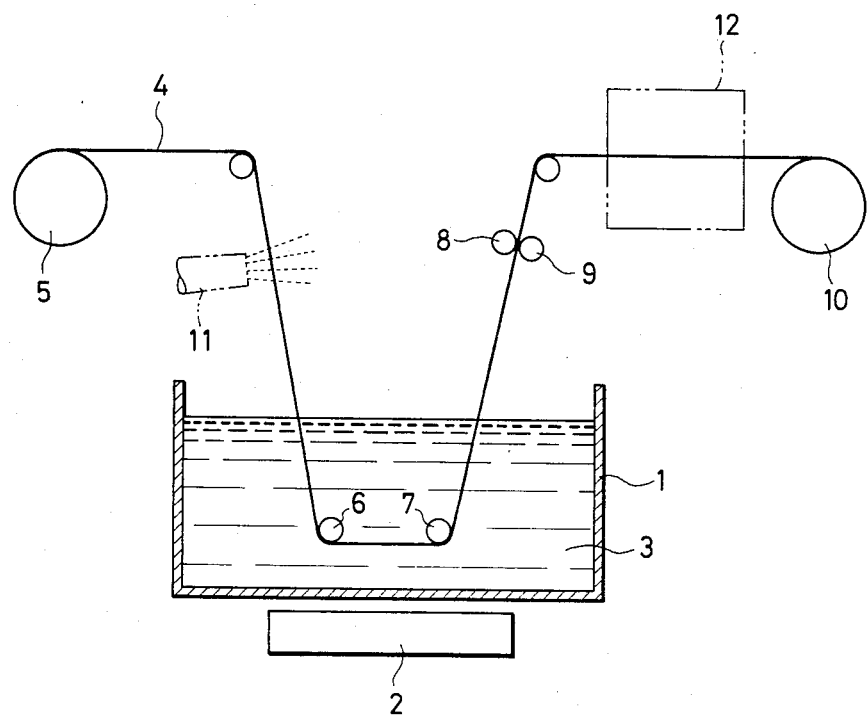
FIG. 2 is a schematic representation of an apparatus for producing fiber-reinforced metal according to the process of this invention.

The fibrous material of this invention was prepared by using an apparatus as shown in FIG. 2. The bath 1 contains a suspension composed of 1000 cc of ethyl alcohol and 5 g of silicon carbide whiskers (having an average diameter of about 0.2 μm and an average length of about 100 μm). The whiskers were suspended by ultrasonic vibration generated by the ultrasonic generator 2. The carbon fiber bundle 4 (M40 made by Toray Industries, Inc., composed of 6000 filaments, each filament 7 to 8 μm in diameter, sized) supplied from the bobbin 5 was passed through the suspension 3 at such a speed that it was dipped in the suspension for 15 seconds. The speed was properly controlled by the rolls 6 and 7. After dipping, the carbon fiber bundle was squeezed by the rolls 8 and 9 and finally wound up onto the bobbin 10, followed by air-drying at room temperature. The blower 11 and the drying oven 12 were used when necessary.

Figure 4:
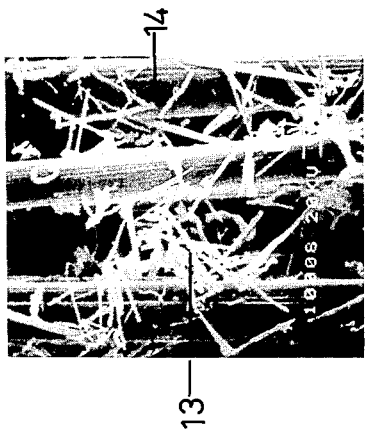

After dipping, the black carbon fiber bundle assumed a greenish brown color. Observation under an electron microscope indicated that the whiskers 13 stuck to the individual continuous filament fibers 14 as shown in FIGS. 3 and 4. The weighing after treatment indicated that 0.15 g of the whiskers stuck to 10 m each of the carbon fiber bundle.

EXAMPLE 2

The same procedure as in Example 1 was repeated except that the silicon carbide whiskers were replaced by silicon nitride whiskers (having an average diameter of about 0.3 μm and an average length of about 200 μm). It was found that 0.2 g of the whiskers stuck to 10 m each of the carbon fiber bundle.

EXAMPLE 3

The same procedure as in Example 1 was repeated except that the amount of the silicon carbide whiskers was changed to 25 g, the carbon fiber was replaced by alumina fiber made by Sumitomo Chemical Co., Ltd., and the dipping was performed for 10 seconds with ultrasonic vibration at 28 kHz.

Figure 5:
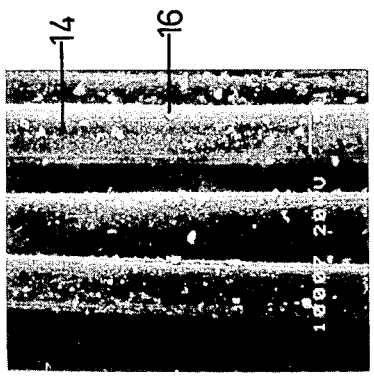

After dipping, the white alumina fiber bundle assumed a greenish brown color. Observation under an electron microscope indicated that the whiskers 13 stuck to the individual continuous filament fibers 14 as shown in FIG. 5. The weighing after treatment indicated that 0.1 g of the whiskers stuck to 10 m each of the alumina fiber bundle.

EXAMPLE 4

The same procedure as in Example 1 was repeated except that the amount of the silicon carbide whiskers was changed to 25 g, M40 (carbon fiber bundle, sized) was replaced by M40 (made by Toray Industries, Inc., composed of 6000 fibers, each fiber 7 to 8 μm in diameter, unsized) and the dipping performed for 8 seconds with ultrasonic vibration at 45 kHz.

After dipping, the black carbon fiber bundle assumed a greenish brown color. The weighing after treatment indicated that 0.25 g of the whiskers stuck to 10 m each of the carbon fiber bundle.

EXAMPLE 5

The same procedure as in Example 1 was repeated except that 25 g of silicon nitride whiskers were used in place of the silicon carbide whiskers, a silicon carbide fiber bundle ("Nicalon", a product of Nippon Carbon Co., Ltd.) was used in place of the carbon fiber bundle, the dipping was performed for 8 seconds with ultrasonic vibration at 28 kHz.

The weighing after treatment indicated that 0.42 g of the whiskers stuck to 10 m each of the silicon carbide fiber bundle.

EXAMPLE 6

Figure 6:
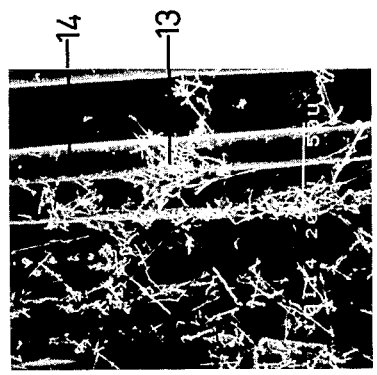

The same procedure as in Example 1 was repeated except that 20 g of beta-silicon carbide powder (0.23 μm in average diameter) was suspended in 1000 cc of ethyl alcohol. Observation under an electron microscope indicated that the silicon carbide powders 16 were present on the fibers or in the space between the fibers as shown in FIG. 6. The weighing after drying indicated that 0.15 g of the silicon carbide powder stuck to 10 m each of the carbon fiber bundle.

EXAMPLE 7

The same procedure as in Example 6 was repeated except that the beta-silicon carbide powder was replaced by alpha-alumina powder (0.03 μm in average diameter) and the dipping was performed for about 10 seconds. The weighing after drying indicated that 0.1 g of the alumina powder stuck to 10 m each of the carbon fiber bundle.

Figure 7:
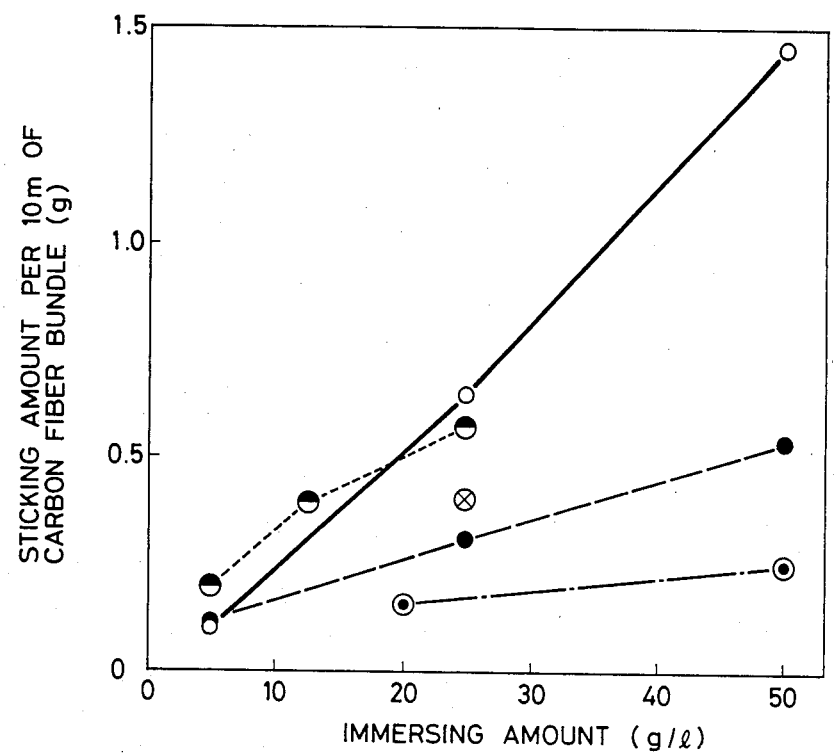
FIG. 7 is a graph showing the relationship between the condition of treating a carbon fiber bundle and the amount of whiskers or powders which stick to the carbon fiber bundle.

FIG. 7 shows the relationship between the concentration of whiskers or powders in the suspension and the amount of whiskers or power which had stuck to 10 m each of the carbon fibers (6000 fibers/bundle). The suspending medium was water or ethyl alcohol and the ultrasonic vibration was applied or not applied. The effect of ultrasonic vibration is apparent, especially in the case where the suspending medium is ethyl alcohol. These results suggest that the amount of whiskers or powders to stick to the carbon fibers can be controlled as desired by properly selecting the conditions.

EXAMPLE 8

A sample of fiber-reinforced metal was prepared as follows: The fibrous material produced in Example 1 was cut to a length of 150 mm. 100 of the cut pieces 17 were bundled and the bundle was inserted into a steel pipe 18, as shown in FIG. 8(A). The steel pipe 18 was preheated at 720° C. in nitrogen gas as shown in FIG. 8(B). The steel pipe 18 then was placed in the mold 20, as shown in FIG. 8(C). Molten metal 20 (pure magnesium at 720° C.) was poured into the die and was pressed at 750 kg/cm$^2$ for 60 seconds using the punch 22.

The resulting FRM had the same structure (in section perpendicular to the axis of the continuous filament fiber) as shown in FIG. 1. There were a large number of whiskers in the space between fibers and there were only a few fibers which were in contact with one another.

EXAMPLE 9

An example of the FRM of this invention produced from the fibrous material of this invention has a structure as shown by the optical micrograph in FIG. 1. It is noted that the continuous filament fibers 14 are evenly distributed in the matrix metal 15 owing to the whiskers 13 sticking to the fibers which separate the fibers from one another. The carbon fiber/aluminum composite material has a compressive shear strength of 10 kg/mm$^2$ in the case where silicon carbide whiskers were used for the fibrous material, whereas it was 2 kg/mm$^2$ in the case where silicon carbide whiskers were not used. Moreover, in the former case, it was possible to set up the fiber volume ratio in the range of 10 to 70%, whereas in the latter case, the fiber volume ratio was in the narrow range from 60 to 70%.

Measurements of flexural strength: Different kinds of FRM samples of this invention were prepared according to the same procedure as in Example 1 except that the condition for the deposition of whiskers was changed. They were examined for flexural strength in the direction perpendicular to the axis of the continuous filament fibers. The results are shown in FIG. 9. It is noted that the flexural strength of the FRM of this invention is about 2 to 5 times greater than that of conventional FRM. An apparent effect is produced in using as reinforcements, continuous filament fibers and whiskers in combination with each other. Moreover, an apparent effect is also produced in applying ultrasonic vibration and using ethyl alcohol as a suspending medium. These results indicate that a high flexural strength can be obtained where a proper condition is selected for the deposition of whiskers.

As mentioned above, the present invention has the following advantages. According to this invention, the fibrous material for composite materials is composed of bundles of continuous filament fibers having at least one kind of short fibers, whiskers, or powders sticking to the surface of individual continuous fibers. Because of this structure, the continuous filament fibers are evenly distributed in the composite material. This makes it possible to control the fiber volume ratio over a broad range. In addition, a variety of requirements for the properties of FRM can be satisfied by changing the combination of continuous filament fibers and short fibers (or whiskers or powders) in many ways. The continuous filament fibers evenly distributed in FRM contribute to the uniform composition of FRM and hence improve mechanical properties, such as the compressive shear strengths of FRM.

According to this invention, the fibrous material for composite materials can be produced efficiently in a simple manner by dipping continuous filament fibers or a bundle thereof in a suspension containing short fibers, whiskers, or powder to be attached to the surface of the continuous filament fibers. The dipping is performed by unwinding the continuous filament fibers from a bobbin, passing them through the suspension, and rewinding them onto a bobbin. The suspension may be subjected to ultrasonic vibration and an organic solvent may be used as a suspending medium. The use of ultrasonic vibration and organic solvent permits the amount of deposition to be controlled as desired. This makes it possible to produce a variety of fibrous materials for composite materials with the same equipment.

The fiber-reinforced metal of this invention is composed of continuous filament fibers, at least one kind of short fibers, whiskers, or powders sticking to the surface of the individual continuous filament fibers, and a matrix metal. Because of this structure, individual continuous filament fibers are evenly distributed in the matrix metal, and this makes it possible to control the fiber volume over a broad range. Since the three components can be combined in many ways, it is possible to satisfy the performance requirement over a broad range. The continuous filament fibers evenly distributed in the FRM contribute to the uniform composition of FRM and hence improve mechanical properties such as the compressive shear strengths of FRM, especially strength in the direction perpendicular to the axis of the continuous filament fibers. This reduces the anisotropy of FRM.

According to this invention, the fiber-reinforced metal can be produced efficiently in a simple manner by pouring a molten metal into a mold cavity in which is previously placed the above-mentioned fibrous material or a preform produced therefrom. Since the fibrous material is available in various kinds as mentioned above, it is possible to produce fiber-reinforced metals with varied shapes and properties.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for producing a fibrous material for composite materials, comprising:
   loosening a bundle of individual continuous fibers made of at least one heat resistant substance selected from the group consisting of ceramics, carbon, metals and intermetallic compounds, and
   dipping said bundle of individual continuous fibers in a bath containing a suspending medium and short fibers, whiskers, or powders made of at least one heat resistant substance selected from the group consisting of ceramics, carbon, metals and intermetallic compounds,
   thereby attaching said short fibers, whiskers, or powders to a surface of the individual continuous fibers.

2. The process of claim 1, wherein the suspending medium is subjected to ultrasonic vibration.

3. The process of claim 2, wherein the ultrasonic vibration has a frequency of 10 to 2000 kHz.

4. The process of claim 1, wherein the suspending medium is organic and is subjected to ultrasonic vibration.

5. The process of claim 4, wherein the suspending medium is ethyl alcohol.

6. The process of claim 1, wherein the bundle of continuous fibers is loosened by a blower before dipping in the suspending medium.

7. The process of claim 1, wherein the continuous fibers are carbon fibers.

8. The process of claim 1, wherein the continuous fibers are alumina fibers.

9. The process of claim 1, wherein the continuous fibers are silicon carbide fibers.

10. The process of claim 1, wherein the whiskers are silicon carbide whiskers.

11. The process of claim 1, wherein the whiskers are silicon nitride whiskers.

12. The process of claim 1, wherein the powders are alumina powders.

13. The process of claim 1, wherein the powders are silicon carbide powders.

14. The process of claim 1, wherein the concentration of whiskers is 0.5 to 30 g/liter.

15. The process of claim 1, wherein the concentration of powders is 0.5 to 30 g/liter.

16. The process of claim 1, wherein the ceramics are selected from the group consisting of silicon carbide, silicon nitride, alumina, silica, alumina-silica, zirconia, beryllia, boron carbide, and titanium carbide.

17. A process for producing fibrous material for composite materials, comprising:
   dipping individual continuous fibers or a bundle of individual continuous fibers made of at least one heat resistant substance selected from the group consisting of ceramics and carbon in a bath containing a suspending medium and short fibers, whiskers, or powders made of at least one heat resistant substance selected from the group consisting of ceramics, carbon, metals and intermetallic compounds, thereby attaching said short fibers, whiskers, or powders to a surface of the individual continuous fibers.

* * * * *